United States Patent Office 3,398,211
Patented Aug. 20, 1968

3,398,211
DIGLYCIDYL ETHERS OF POLYHYDRIC ALCOHOLS WITH DIAMINES OR HYDROQUINONES AND 1,4-CYCLOHEXADIENE DIOXIDE
Thomas Ramos, 536 Fort Washington Ave., New York, N.Y. 10033
No Drawing. Continuation-in-part of application Ser. No. 512,269, Dec. 6, 1965. This application Mar. 8, 1966, Ser. No. 534,970
9 Claims. (Cl. 260—830)

ABSTRACT OF THE DISCLOSURE

Synthetic resins derived from a diglycidyl ether of a polyhydric alcohol, a phenol and a diepoxy cycloaliphatic diene. These resins are useful for embedding, encapsulating, casting, filament winding, reinforced plastics and syntactic foam applications.

One such resin is derived from 1,4-butanediol diglycidyl ether, mono-tertiary butylhydroquinone and 1,4-cyclohexadiene dioxide.

The invention described herein may be manufactured and used by or for the Government of the United States of America for governmental purposes without the payment of any royalties thereon or therefor.

This is a continuation-in-part of my co-pending application Ser. No. 512,269, filed Dec. 6, 1965.

This invention relates to synthetic resinous materials or polymers, and more particularly to those useful for embedding, encapsulating, laminating, casting, filament winding, sealing, potting, reinforced plastics, coating, and syntactic foam applications.

There has long been a need for a satisfactory resin that can be used to encapsulate or embed delicate equipment and various items for their protection, but resins heretofore available for this purpose have been unsatisfactory for various reasons, one of which was because they were so brittle and hard that they did not give the desired degree of protection.

An object of this invention is to provide new and improved resins, and methods of making them, which are especially useful, suitable and practical for embedding and encapsulating electronic equipment and other items, and as coating materials, which have desired physical properties including selected degree of hardness and structural strength when cured to make them suitable for the intended purpose, and which are relatively inexpensive, easily made, and practical and durable in use.

Other objects and advantages will appear from the following description of some examples of the invention, and the novel features will be particularly pointed out in connection with the appended claims.

In accordance with this invention, synthetic resins and, in particular, novel block copolymers, having important and useful physical properties may be prepared by the inter-reaction of certain diglycidyl ethers such as those obtained from certain polyhydric alcohols, with (1) either (a) an aromatic chlorine hindered diamine or aromatic sulphur-containing diamine such as, for example, 4,4'-methylene-bis(2 chloroaniline) or 4,4'-diaminodiphenyl sulfone, or (b) with hydroquinone and also its derivatives such as monotertiary butyl hydroquinone, toluhydroquinone and hydroquinone monomethyl ether, and further with (2) 1,4-cyclohexadiene dioxide to produce a block prepolymer and then adding to the said product of such reaction, at a time just prior to the curing of such product, a suitable curing agent such as an aromatic amine or aliphatic amine.

Examples of diglycidyl ethers obtained from epichlorohydrin and a chlorohydrin ether of a polyhydric alcohol which may be employed are disclosed in U.S. Patent 3,033,803, issued May 8, 1962. Some examples of polyhydric alcohols that may be used in preparing diglycidyl ethers of polyhydric alcohols are those having a hydrocarbon chain between the hydroxyl groups. These polyhydric alcohols are advantageous in imparting an aliphatic hydrocarbon element into the resulting glycide ether. Among such alcohols are ethylene glycol, butanediol, pentanediol, diethylene glycol, triethylene glycol, hexanetriol, glycerol, and various polyethylene glycols and polypropylene glycols, etc. These diglycidyl ethers obtained with such polyhydric alcohols in accordance with the disclosure in said U.S. Patent # 3,033,803 are the basic components used for reaction with the particular diamines or with the hydroquinone or its derivatives and further with the cyclohexadiene dioxide in accordance with this invention.

Some specific examples of the polyhydric alcohols used for the preparation of the diglycidyl ethers that may be employed include ethylene glycol; diethylene glycol; triethylene glycol; tripropylene glycol; 1,5-pentanediol; 1,4-butanediol; 1,3-butanediol; 2,3-butanediol and 2-butenediol-1,4.

Examples of diglycidyl ethers include:

DIGLYCIDYL ETHERS OF POLYHYDRICALCOHOLS 1,4-butanediol diglycidyl ether
1,3-butanediol diglycidyl ether
2,3-butanediol diglycidyl ether
1,5-pentanediol diglycidyl ether
Ethylene glycol diglycidyl ether
Diethylene glycol diglycidyl ether
Triethylene glycol diglycidyl ether
Tripropylene glycol dilycidyl ether
Hexanetriol diglycidyl ether
Polyethylene glycol diglycidyl ether
Glycerine diglycidyl ether
2-butenediol-1,4-diglycidyl ether Specific hydroquinone and amine inter-reactants are:

HYDROQUINONES

Hydroquinone
Toluhydroquinone
Hydroquinone monomethyl ether
Mono-tertiary butyl hydroquinone

AROMATIC DIAMINES 4,4'-methylene-bis-(2-chloroaniline)
4,4'-diaminodiphenyl sulfone The three-component reaction product (i.e., (A) diglycidyl ether of a polyhydric alcohol and component (B) aromatic diamines [or hydroquinone] and (C) 1,4-cyclohexadiene dioxide) is prepared as follows:

To be even more specific glyamine prepolymers are the basic component used to form block prepolymers with the following types of epoxy resins:

(a) 1,4-cyclohexadiene dioxide, its various isomers, its derivatives and their homopolymers.

(b) Any other diepoxy resin derived from cycloaliphatic dienes.

(c) Any epoxy resin which contains more than one oxirane atom bonded to cycloaliphatic carbon atoms.

(d) Any combination of the mixture of (a), (b) or (c) thereof.

Specific combination of diglycidyl ethers of polyhydric alcohols (reactant (A) and the other co-reactant (B)), to produce the glyamine prepolymers employed in the present invention are tabulated below:

GLYAMINE PREPOLYMERS

The said prepolymers are the reaction products of:

1,4-butanediol diglycidyl ether and hydroquinone
1,4-butanediol diglycidyl ether and toluhydroquinone
1,4-butanediol diglycidyl ether and hydroquinone mono methyl ether
1,4-butanediol diglycidyl ether and mono-tertiary butyl hydroquinone
1,4-butanediol diglycidyl ether and 4,4'methylene-bis(2-chloroaniline)
1,4-butanediol diglycidyl ether and 4,4' diaminodiphenyl sulfone
1,3-butanediol diglycidyl ether and hydroquinone
1,3-butanediol diglycidyl ether and toluhydroquinone
1,3-butanediol diglycidyl ether and hydroquinone mono methyl ether
1,3-butanediol diglycidyl ether and mono-tertiary butyl hydroquinone
1,3-butanediol diglycidyl ether and 4,4'-methylene-bis(2-chloroaniline)
1,3-butanediol diglycidyl ether and 4,4'-diaminodiphenyl sulfone
2,3-butanediol diglycidyl ether and hydroquinone
2,3-butanediol diglycidyl ether and toluhydroquinone
2,3-butanediol diglycidyl ether and hydroquinone mono methyl ether
2,3-butanediol diglycidyl ether and mono-tertiary butyl hydroquinone
2,3-butanediol diglycidyl ether and 4,4'-methylene-bis(2-chloroaniline)
2,3-butanediol diglycidyl ether and 4,4' diaminodiphenyl sulfone
2-butenediol-1,4-diglycidyl ether and hydroquinone
2-butenediol-1,4-diglycidyl ether and toluhydroquinone
2-butenediol-1,4-diglycidyl ether and hydroquinone mono methyl ether
2-butenediol-1,4-diglycidyl ether and mono-tertiary butyl hydroquinone
2-butenediol-1,4-diglycidyl ether and 4,4'-methylene-bis(2-chloroaniline)
2-butenediol-1,4-diglycidyl ether and 4,4'-diaminodiphenyl sulfone
1,5-pentanediol diglycidyl ether and hydroquinone
1,5-pentanediol diglycidyl ether and toluhydroquinone
1,5-pentanediol diglycidyl ether and hydroquinone mono methyl ether
1,5-pentanediol diglycidyl ether and mono-tertiary butyl hydroquinone
1,5-pentanediol diglycidyl ether and 4,4'-methylene-bis(2-chloroaniline)
1,5-pentanediol diglycidyl ether and 4,4'-diaminodiphenyl sulfone
ethylene glycol diglycidyl ether and hydroquinone
ethylene glycol diglycidyl ether and toluhydroquinone
ethylene glycol diglycidyl ether and hydroquinone mono methyl ether
ethylene glycol diglycidyl ether and mono-tertiary butyl hydroquinone
ethylene glycol diglycidyl ether and 4,4'-methylene bis(2-chloroaniline)
ethylene glycol diglycidyl ether and 4,4'-diaminodiphenyl sulfone
diethylene glycol diglycidyl ether and hydroquinone
diethylene glycol diglycidyl ether and toluhydroquinone
diethylene glycol diglycidyl ether and hydroquinone mono methyl ether
diethylene glycol diglycidyl ether and mono-tertiary butyl hydroquinone
diethylene glycol diglycidyl ether and 4,4'-methylene-bis(2-chloroaniline)
diethylene glycol diglycidyl ether and 4,4'-diaminodiphenyl sulfone
triethylene glycol diglycidyl ether and hydroquinone
triethylene glycol diglycidyl ether and toluhydroquinone
triethylene glycol diglycidyl ether and hydroquinone mono methyl ether
triethylene glycol diglycidyl ether and mono-tertiary butyl hydroquinone
triethylene glycol diglycidyl ether and 4,4'-methylene-bis(2-chloroaniline)
triethylene glycol diglycidyl ether and 4,4'-diaminodiphenyl sulfone
tripropylene glycol diglycidyl ether and hydroquinone
tripropylene glycol diglycidyl ether and toluhydroquinone
tripropylene glycol diglycidyl ether and hydroquinone mono methyl ether
tripropylene glycol diglycidyl ether and mono-tertiary butyl hydroquinone
tripropylene glycol diglycidyl ether and 4,4'-methylene-bis(2-chloroaniline)
tripropylene glycol diglycidyl ether and 4,4'-diaminodiphenyl sulfone
hexanetriol diglycidyl ether and hydroquinone
hexanetriol diglycidyl ether and toluhydroquinone
hexanetriol diglycidyl ether and hydroquinone mono methyl ether
hexanetriol diglycidyl ether and mono-tertiary butyl hydroquinone
hexanetriol diglycidyl ether and 4,4'-methylene-bis (2-chloroaniline)
hexanetriol diglycidyl ether and 4,4'-diaminodiphenyl sulfone
polyethylene glycol diglycidyl ether and hydroquinone
polyethylene glycol diglycidyl ether and toluhydroquinone
polyethylene glycol diglycidyl ether and hydroquinone mono methyl ether
polyethylene glycol diglycidyl ether and mono-tertiary butyl hydroquinone
polyethylene glyocl diglycidyl ether and 4,4'-methylene-bis(2-chloroaniline)
polyethylene glycol diglycidyl ether and 4,4'-diaminodiphenyl sulfone
glycerine diglycidyl ether and hydroquinone
glycerine diglycidyl ether and toluhydroquinone
glycerine diglycidyl ether and hydroquinone mono methyl ether
glycerine diglycidyl ether and mono-tertiary butyl hydroquinone
glycerine diglycidyl ether and 4,4'-methylenebis (2-chloroaniline)
glycerine diglycidyl ether and 4,4'-diaminodiphenyl sulfone The above reaction products as obtained are low viscosity liquids. In preparing the above prepolymers, it has been found that for each 100 parts by weight of diglycidyl ether, there should be employed from about 15 to 85 parts by weight of the amine or phenolic co-reactant.

The general procedure for preparing such prepolymers involves mixing the reactants, and preferably by adding to the preheated diglycidyl ether the other co-reactant, maintaining the reaction mixture, while stirring, to a temperature between about 100° C. (212° F.) and about 132° C. (270° F.) but not over 150° C. (about 300° F.) until a homogeneous liquid is obtained. When such homogeneity results, the reaction mixture is immediately cooled to about room temperature, i.e. between about 50° F. and 100° F.

The amount of 1,4-cyclohexadiene dioxide component (C) may vary from about 1 part by weight thereof per 10 parts by weight of glyamine prepolymer to 10 parts by weight thereof per 1 part by weight of glyamine prepolymer. The preferred glyamine prepolymers are as follows:

EXAMPLES OF PREFERRED GLYAMINE PREPOLYMERS 1,4-butanediol diglycidyl ether and hydroquinone
1,4-butanediol diglycidyl ether and toluhydroquinone
1,4-butanediol diglycidyl ether and hydroquinone mono methyl ether
1,4-butanediol diglycidyl ether and mono-tertiary butyl hydroquinone
1,3-butanediol diglycidyl ether and hydroquinone
1,3-butanediol diglycidyl ether and toluhydroquinone
1,3-butanediol diglycidyl ether and hydroquinone mono methyl ether
1,3-butanediol diglycidyl ether and mono-tertiary butyl hydroquinone
2,3-butanediol diglycidyl ether and hydroquinone
2,3-butanediol diglycidyl ether and toluhydroquinone
2,3-butanediol diglycidyl ether and mono-tertiary butyl hydroquinone
2,3-butanediol diglycidyl ether and hydroquinone mono methyl ether
2-butenediol 1,4 diglycidyl ether and hydroquinone
2-butenediol 1,4 diglycidyl ether and toluhydroquinone
2-butenediol 1,4 diglycidyl ether and hydroquinone mono methyl ether
2-butenediol 1,4 diglycidyl ether and mono-tertiary butyl hydroquinone
1,5-pentanediol diglycidyl ether and hydroquinone
1,5-pentanediol diglycidyl ether and toluhydroquinone
1,5-pentanediol diglycidyl ether and hydroquinone mono methyl ether
1,5-pentanediol diglycidyl ether and mono-tertiary butyl hydroquinone
Ethylene glycol diglycidyl ether and hydroquinone
Ethylene glycol diglycidyl ether and toluhydroquinone
Ethylene glycol diglycidyl ether and hydroquinone mono methyl ether
Ethylene glycol diglycidyl ether and mono-tertiary butyl hydroquinone
Diethylene glycol diglycidyl ether and hydroquinone
Diethylene glycol diglycidyl ether and toluhydroquinone
Diethylene glycol diglycidyl ether and hydroquinone mono methyl ether
Diethylene glycol diglycidyl ether and mono-tertiary butyl hydroquinone
Triethylene glycol diglycidyl ether and hydroquinone
Triethylene glycol diglycidyl ether and toluhydroquinone
Triethylene glycol diglycidyl ether and hydroquinone mono methyl ether
Triethylene glycol diglycidyl ether and mono-tertiary butyl hydroquinone
Tripropylene glycol diglycidyl ether and hydroquinone
Tripropylene glycol diglycidyl ether and toluhydroquinone
Tripropylene glycol diglycidyl ether and hydroquinone mono methyl ether
Tripropylene glycol diglycidyl ether and mono-tertiary butyl hydroquinone
Hexanetriol diglycidyl ether and hydroquinone
Hexanetriol diglycidyl ether and toluhydroquinone
Hexanetriol diglycidyl ether and hydroquinone mono methyl ether
Hexanetriol diglycidyl ether and mono-tertiary butyl hydroquinone
Polyethylene glycol diglycidyl ether and hydroquinone
Polyethylene glycol diglycidyl ether and toluhydroquinone
Polyethylene glycol diglycidyl ether and hydroquinone mono methyl ether
Polyethylene glycol diglycidyl ether and mono-tertiary butyl hydroquinone
Glycerine diglycidyl ether and hydroquinone
Glycerine diglycidyl ether and toluhydroquinone
Glycerine diglycidyl ether and hydroquinone mono methyl ether
Glycerine diglycidyl ether and mono-tertiary butyl hydroquinone.

It is to be noted that one, two or more mixtures of glyamine prepolymers may be reacted with one, two or more mixtures of the epoxy resins, as defined above, to form block prepolymers. Similarly, mixtures of curing agents may be used to cure the block prepolymers. The three-component block prepolymer is then reacted to the final cured block prepolymer resin with an amine curing agent.

Suitable curing agents include:

ALIPHATIC AMINES

N-aminoethylpiperazine
Diethylenetriamine
Trimethylenediamine
Tetraethylenepentamine
3-isopropylaminopropylamine
Trimethylenediamine
Propylene diamine.

AROMATIC AMINES

Metaphenylenediamine,
Meta-tolylenediamine,
1,8-naphthylenediamine.

As a general criterion, the particular curing agent employed will be determined by the maximum operating temperature limits and flexibility of the cured resin. Since the curing agent used in this invention becomes an integral part of the cured resin, the type and amount of curing agent employed has a profound effect on the physical and chemical properties of the cured resin.

The following generalizations should prove useful in selecting other amines for use in this invention:

(a) To be useful as room temperature curing agents for this invention, the amines or amine mixtures must have an average functionality greater than about 2, i.e., more than 2 amine hydrogens per molecule.

(b) Aromatic amines, those which have the amine groups attached directly to a benzene ring or other aromatic nucleus, are suitable as curing agents for this invention. These are the preferred curing agents.

(c) Provided that suitable curing agents, as defined in (a) or (b) above, are used, the degree of cure, as measured by hardness, solvent resistance and/or flexibility, increases with functionality of the amines and decreases as the distance between amine hydrogens increases.

(d) Fexibility and flexibility retention fall off with increasing degree of cure.

The following examples will illustrate the preparation of glyamine prepolymers, block prepolymers, and cured block copolymer resins in accordance with this invention, without being deemed limitative thereof. Parts are by weight unless otherwise indicated.

Example 1

55.0 parts by weight of 4,4'-methylene-bis(2-chloroanaline) are added slowly while stirring to 100.00 parts by weight of 1,4-butanediol diglycidyl ether that has been preheated to between 212–225° F. The mixture is thereafter maintained at between 212–225° F. while stirring until a homogeneous liquid is obtained. If the temperature exceeds 250° F., the reaction is too rapid and should be avoided. External cooling may be used, if necessary. The reaction product thus obtained is immediately cooled to room temperature to inhibit further reaction and is hereinafter, for convenience, called "Glyamine A" prepolymer.

Typical or representative tabulation of approximate amounts of constituents used in obtaining "Glyamine A"

prepolymer in accordance with the process as outlined in Example 1, are as follows:

Example 2

Constituents: Parts by weight
- 1,4-butanediol diglycidyl ether _____ 100
- 4,4'-methylene-bis (2-chloroaniline) _____ 15–85

A specific example of a "Glyamine A" prepolymer prepared from the reaction of 1,4-butanediol diglycidyl ether with 4,4'-diaminodiphenyl sulfone is as follows:

Example 3

55.0 parts by weight of 4,4'-diaminodiphenyl sulfone are added slowly while stirring to 100 parts by weight 1,4-butanediol diglycidyl ether, preheated to between 240–250° F. The mixture is thereafter maintained at between 240–250° F. while stirring until a homogeneous liquid is obtained. The temperature should not exceed 250° F., using external cooling, if necessary. The reaction product thus obtained is immediately cooled to room temperature and is hereinafter also called "Glyamine A" prepolymer.

The following example is a typical or representative tabulation of approximate amounts of constituents used in obtaining "Glyamine A" prepolymer in accordance with the process as outlined in Example 3 above and is as follows:

Example 4

Constituents: Parts by weight
- 1,4-butanediol diglycidyl ether _____ 100
- 4,4'-diaminodiphenyl sulfone _____ 15–85

The above Examples 3 and 4 serve to illustrate that as a general rule "Glyamine A" prepolymers can be prepared in different ways to yield products which exhibit a range of properties depending on choice of reactants, method or preparation and ratio of reactants.

"Moca" is the trade name for 4,4'-methylene-bis-(2-chloroaniline) marketed by E. I. du Pont de Nemours Company, Inc. "Moca" is described, for example, in Development Products Report No. 2 of March 1, 1957, published in printed form and distributed by the said E. I. du Pont de Nemours Co., Inc. "Moca" comes in several physical forms, one form being a fine powder, light tan in color, the other form being in pellets almost white in color. It is preferred to use "Moca" in the physical form of pellets which are almost white in color.

For the sake of color, uniformity of product and quality control of the products as made in accordance with my invention, it is preferred that "Moca" in the physical form of pellets, be used.

Substitution of one physical form of "Moca" for the other will yield products of different colors and properties which will lack some uniformity of product from batch to batch.

"Araldite RD-2" is the trade name for 1,4-butanediol diglycidyl ether, is marketed by Ciba Products Corporation, Kimberton, Pa., and is described in Provisional Technical Data Bulletin 27, published in printed form and distributed by the said Ciba Products Corporation.

4,4'-diaminodiphenyl sulfone is marketed by the Ciba Products Corporation, Fairlawn, N.J. under the trade name of "Ciba Eporal" and is described in printed form, in Technical Data Bulletin 21128/1 published by Ciba Products Corporation.

Example 5

55.0 parts by weight of mono-tertiary-butylhydroquinone are added slowly, while stirring to 100.0 parts by weight 1,4-butanediol diglycidyl ether, preheated to between 250–260° F. The mixture is thereafter maintained at between 250–260° F., while stirring until a homogeneous liquid is obtained. The temperature should not exceed 260° F., using external cooling if necessary. The reaction product thus obtained is immediately cooled to room temperature and is hereinafter called "Glyamine B" prepolymer.

Typical or representative tabulation of approximate amounts of constituents used in obtaining "Glyamine B" prepolymer in accordance with process as outlined in Example 5 are as follows:

Example 6

Constituents: Parts by weight
- 1,4-butanediol diglycidyl ether _____ 100
- Mono-tertiary butylhydroquinone _____ 15–85

In each of all examples given herein, the mixing may be performed in any manner such as, for example, in propeller type mixers or stirrers, or by any other efficient means for producing a homogeneous product.

Other hydroquinones which generally find use in the preparation of "Glyamine B" prepolymer are as follows:

HYDROQUINONE DERIVATIVES WHICH MAY BE USED 2,5-ditertiary butyl hydroquinone All of the said above hydroquinone derivatives are marketed by Eastman Chemical Products, Inc., Kingsport, Tenn.

Mono-tertiary-butylhydroquinone is also marketed by Eastman Chemical Products, Inc. The properties of this hydroquinone are set forth in Technical Data Sheet No. D-108, published in printed form, prior to my invention by the Eastman Chemical Products, Inc.

Other "Glyamine B" prepolymers based on hydroquinone derivatives are as follows:

Example 7

55.0 parts by weight of hydroquinone monomethyl ether are added slowly while stirring to 100.0 parts by weight of 1,4-butanediol diglycidyl ether that has been preheated to between 140–212° F. The mixture is thereafter maintained at between 140–212° F. while stirring until a homogeneous liquid is obtained. The temperature should not exceed above 220° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process as outlined in Example 7 above:

Example 8

Constituents: Parts by weight
- 1,4-butanediol diglycidyl ether _____ 100
- Hydroquinone mono methyl ether _____ 15–62

Example 9

55.0 parts by weight of toluhydroquinone are added slowly while stirring to 100.0 parts by weight of 1,4-butanediol diglycidyl ether that has been preheated to between 212–260° F. The mixture is thereafter maintained at between 212–260° F. while stirring until a homogeneous liquid is obtained. The temperature shall not exceed 270° F. The reaction product thus obtained is immediately cooled to room temperature or below to inhibit further reaction and is also called "Glyamine B" prepolymer.

The following example is a typical tabulation of approximate amounts of constituents used in obtaining "Glyamine B" prepolymer in accordance with the process in Example 9 above.

Example 10

Constituents: Parts by weight
- 1,4-butanediol digylcidyl ether _____ 100
- Toluhydroquinone _____ 15–62

Example 11

Example 1 is repeated employing the following diglycidyl ethers in equilavent amounts in place of 1,4-butanediol diglycidyl ether:

A. 1,3-butanediol diglycidyl ether
B. 2,3-butanediol diglycidyl ether
C. 2-butenediol-1,4-diglycidyl ether
D. 1,5-pentanediol diglycidyl ether
E. Ethylene glycol diglycidyl ether
F. Diethylene glycol diglycidyl ether
G. Triethylene glycol diglycidyl ether
H. Tripropylene glycol diglycidyl ether
I. Hexanetriol diglycidyl ether
J. Polyethylene glycol diglycidyl ether
K. Glycerine diglycidyl ether Example 12

Example 11 is repeated using the following in equivalent amounts in place of the chloroaniline of that example:

A. 4,4'-diaminodiphenylsulfone
B. Hydroquinone
C. Toluhydroquinone
D. Hydroquinone monomethyl ether
E. Mono-tertiary butyl hydroquinone Example 13

Examples 12A, 12B, 12C, 12D, and 12E are each repeated, separately, using in place of 1,3-butanediol diglycidyl ether, the following in equivalent amounts:

(1) 2,3-butanediol diglycidyl ether
(2) 2-butenediol-1,4-diglycidyl ether
(3) 1,5-pentanediol digylcidyl ether
(4) Ethylene glycol diglycidyl ether
(5) Diethylene glycol diglycidyl ether
(6) Triethylene glycol diglycidyl ether
(7) Tripropylene glycol diglycidyl ether
(8) Hexanetriol diglycidyl ether
(9) Polyethylene glycol diglycidyl ether
(10) Glycerine diglycidyl ether Excellent products, i.e. prepolymers, are obtained.

In the above examples, the prepolymers are described as derived from one diglycidyl ether and a single co-reactant amine or hydroxy compound. It is, of course, clear that two or more different diglycidyl ethers may be reacted with one, two, or more co-reactant amines or hydroquinones.

In each and all Examples 5, 6, 7, 8, 9 and 10, it is of course understood that in each formulation the diepoxy resin derived from cycloaliphatic dienes e.g. 1,4-cyclohexadiene dioxide is added to and prepared at the same time with the other two components to produce the block prepolymers of this invention.

Alternate ways to prepare the block prepolymers of the invention are as follows:

Example 14

100 parts by weight of the glyamine prepolymer of Example 5, and 100 parts by weight of 1,4-cyclohexadiene dioxide are heated to between 142 to 220° F. The mixture is maintained at 142 to 220° F. while stirring until the solid 1,4-cyclohexadiene dioxide is molten and a homogeneous liquid mixture of both reactants is obtained. The reaction product thus obtained is immediately cooled to room temperature and is also called a block prepolymer.

It is postulated that the said above block prepolymer has an epoxide equivalent of about 89.4.

The said block prepolymer was cured using meta-phenylenediamine as the curing agent.

Example 15

Example 14 is repeated using 75 parts by weight of the glyamine prepolymer of Example 5, and 100 parts by weight of 1,4-cyclohexadiene dioxide.

It is postulated that the said above block prepolymer has an epoxide equivalent of about 82.8.

Example 16

Example 14 is again repeated using 50 parts by weight of the glyamine prepolymer of Example 5, and 100 parts by weight of 1,4-cyclohexadiene dioxide.

It is postulated that the said block prepolymer has an epoxide equivalent of about 75.

Example 17

Example 14 is repeated again using 10 parts by weight of the glyamine prepolymer of Example 5, and 100 parts by weight of 1,4-cyclohexadiene dioxide.

It is postulated that the said block prepolymer has an epoxide equivalent of about 62.0.

Example 18

Example 14 is repeated once again using 100 parts by weight of the glyamine prepolymer of Example 5, and 10 parts by weight of 1,4-cyclohexadiene dioxide.

It is postulated that the said block prepolymer has an epoxide equivalent of about 167.

Various additives, mostly conventional ones in a general sense, may be added to the compositions of this invention. These include plasticizers, fillers, stabilizers, antifouling compounds, anti-oxidants, and the like.

Suitable plasticizers are:

dibutyl phthalate
dioctyl phthalate
diethyl phthalate
dibutyl sebacate
dioctyl adipate
dimethyl sebacate
ethylene glycol
propylene glycol
mineral oil
triphenyl phosphate
tricresyl phosphate
tris (beta-chloroethyl) phosphate
tri (dichloropropyl) phosphate
castor oil Any suitable filler may be added to the mixture, according to the invention. A few examples of fillers to be mentioned are iron oxide, lead oxide, aluminum oxide, siliceous chalk, carbon black, silica sand, silica flour, ground mica, calcium carbonate, calcium silicate, granulated cork, graphite, limestone, marble chips, marble flour, silicone carbide, wood flour, vermiculite, and resinous, glass, or metallic spheres. The said spheres may be either solid or hollow.

Other additives or fillers that may be employed in accordance with my invention are glass or resinous microspheres, resinous or glass microballoons, metallic microspheres, metallic microballoons, etc. The said above microballoons or microspheres may be either hollow or solid. The hollow microhperes or hollow microballoons not only act as fillers but also add buoyance to the composition when a body of the composition containing these hollow microspheres or hollow microballoons, or bodies, is immersed in a liquid. The amount of the filler to be used is governed by:

(a) the particle size of the filler, and
(b) the density of the filler, and
(c) the bulking value of the filler.

In addition, the following organotin compounds may be added to the glyamine prepolymers for the preparation of anti-fouling coating or anti-fouling paints:

ORGANOTIN COMPOUNDS dimethyltin dichloride
dibutyltin dichloride
dibutyltin di-2-ethylhexoate
dibutyltin naphthenate
dibutyltin sulfide
diphenyltin dichloride
dioctyltin dichloride dilauryltin dichloride
triethyltin acetate
triisopropyltin chloride
tripropyltin chloride
tributyltin chloride
tributyltin undecenylate
tributyltin dodecylsuccinate
tributyltin oxide
tributyltin sulfide
tributyltin polylinoleate
hexabutyl ditin
triamyltin acetate
triphenyltin chloride
triphenyltin acetate The preferred organotin compound is bis(tri-N-butyltin) oxide. However, of the organotin compounds now available, those containing triphenyltin or tributyltin radicals are likely to function as the most effective marine organism deterrents. The concentration of organotin as an anti-fouling ingredient when added to the glyamine prepolymers is about 100 parts by weight of the glyamine prepolymer to between 10 to 80 parts by weight of the organotin compound. The preferred concentration of organotin is between 50 to 80 parts by weight of tin to 100 parts by weight of the glyamine prepolymer.

Example 19

| Constituents: | Parts by weight |
|---|---|
| Prepolymer obtained by the reaction of 1,4-butanediol diglycidyl ether and mono tertiary butyl hydroquinone | 100 |
| Bis(tri-N-butyltin) oxide | 70 |
| Pyrogenic silica (Cab-O-Sil) | 8 |
| Triethylenetetramine | 8–20 |

The above example demonstrates a specific embodiment wherein an anti-fouling tin compound is used. It is of course understood that in this formulation the 1,4-cyclohexadiene dioxide is to be added as heretofore described and exemplified to produce the block copolymers of this invention.

As a very general rule, various properties in the final cured block copolymer resin are obtainable by varying the components in accordance with the disclosure in this invention. Thus, by using different glyamine prepolymers and by the employment of varying amounts thereof, and further, by selecting different aromatic diamine curing agents, a multitude of different copolymer resins may be produced. It is, of course, clear that the specific requirements of the final resin will determine the particular type of formula which should be used, all within the scope of the action as herein disclosed.

In preparing the block copolymers of the present invention in accordance with the above description and in line with the specific exemplifications which have been given, the following general procedures should be followed in all cases since these have been found to be critical in order to obtain the optimum in properties in the final block copolymer composition. As described and exemplified above, the glyamine prepolymers are first premixed with the 1,4-cyclohexadiene dioxide compound. To this mixture, there is then added the aromatic polyamine curing agents. Since the latter are, in most instances, solid compounds at ambient conditions, i.e., room temperature, it is necessary to premelt the polyamine in order to effect the addition thereof to the other components. The final stage in the production of the block copolymers of this invention involves a curing of the components in accordance with a prescribed curing schedule. Such a curing schedule generally involves extended heated periods of different levels of temperature whereby the temperature is gradually raised until the final cycle is at the most elevated temperature employed during the entire curing steps.

By the use of the term "room temperature" it is intended to include temperatures in the range of about 30° F. to 100° F. in an atmosphere of unspecified relative humidity, including the range of 68° F. to 86° F. recited as the room temperature by the ASTM Standards on Plastics, 12th Edition, March 1961.

It will be further clearly understood that various changes in the details, materials and arrangement of steps which have been herein described and illustrated in order to explain the nature of the invention may be made by those skilled in the art within the principal spirit and scope of the invention as expressed in the appended claims.

I claim:
1. The method for making a resinous block copolymer which comprises adding to a mixture of
   (A) a prepolyer of the reaction product of
      (a) 100 parts by weight of a diglycidyl ether of a polyhydric alcohol having a hydrocarbon chain between the hydroxyl groups, and
      (b) from 15 to 85 parts by weight of a material selected from the group consisting of aromatic chlorine-hindered diamines, aromatic sulfur-containing diamines, hydroquinone, toluhydroquinone, hydroquinone monomethyl ether, mono-tertiary butyl hydroquinone and 2,5-ditertiary butyl hydroquinone
   (B) a material selected from the group consisting of an epoxy resin derived from cycloaliphatic dienes which contains more than one oxirane atom bonded to cycloaliphatic carbon atoms, and varying from 1 part by weight thereof per 10 parts by weight of (A) to 10 parts by weight thereof per 1 part by weight of (A).
2. The method as defined in claim 1, wherein component (a) is 1,4-butanediol diglycidyl ether.
3. The method as defined in claim 1, wherein the component (b) is hydroquinone.
4. The method as defined in claim 1, wherein component (b) is mono-tertiary butylhydroquinone.
5. The method as defined in claim 2, wherein component (b) is hydroquinone.
6. The method as defined in claim 2, wherein component (b) is mono-tertiary butylhydroquinone.
7. The method as defined in claim 1, wherein component (B) is 1,4-cyclohexadiene dioxide
8. A resinous block copolymer comprising the reaction product of
   (A) a prepolymer of the reaction product of
      (a) 100 parts by weight of a diglycidyl ether of a polyhydric alcohol having a hydrocarbon chain between the hydroxyl groups, and
      (b) from 15 to 85 parts by weight of a material selected from the group consisting of aromatic chlorine-hindered diamines, aromatic sulfur-containing diamines, hydroquinone, toluhydroquinone, mono-tertiary butyl hydroquinone, hydroquinone monomethyl ether, and 2,5-ditertiary butyl hydroquinone,
   (B) a material selected from the group consisting of an epoxy resin derived from cycloaliphatic dienes which contains more than one oxirane atom bonded to cycloaliphatic carbon atoms, and varying from 1 part by weight thereof per 10 parts by weight of (A) to 10 parts by weight thereof per 1 part by weight (A).
9. The resinous block copolymer of claim 8, wherein component (B) is 1,4-cyclohexadiene dioxide.

References Cited

UNITED STATES PATENTS

| 3,033,803 | 5/1962 | Price | 260—2 |
| 3,070,579 | 12/1962 | Szwarc | 260—2 |

MURRAY TILLMAN, *Primary Examiner.*

P. LIEBERMAN, *Assistant Examiner.*